United States Patent
Braun

(10) Patent No.: US 7,792,599 B2
(45) Date of Patent: Sep. 7, 2010

(54) ELECTRICAL FIELD DEVICE FOR USE IN PROCESS AUTOMATION

(75) Inventor: Michael Braun, Hatzenbühl (DE)

(73) Assignee: Siemens Aktiengesellschaft, Munich (DE)

( * ) Notice: Subject to any disclaimer, the term of this patent is extended or adjusted under 35 U.S.C. 154(b) by 190 days.

(21) Appl. No.: 11/587,203

(22) PCT Filed: Apr. 27, 2005

(86) PCT No.: PCT/EP2005/004519

§ 371 (c)(1),
(2), (4) Date: Aug. 3, 2007

(87) PCT Pub. No.: WO2005/106606

PCT Pub. Date: Nov. 10, 2005

(65) Prior Publication Data

US 2008/0277463 A1     Nov. 13, 2008

(30) Foreign Application Priority Data

Apr. 27, 2004    (DE) ................. 10 2004 020 577

(51) Int. Cl.
*G06F 17/00* (2006.01)

(52) U.S. Cl. .............. 700/90; 700/110; 710/301; 375/257; 340/3.1

(58) Field of Classification Search .......... 700/90, 700/110; 375/257; 361/119; 710/301; 340/3.1, 340/310.11, 660, 870.11, 870.18

See application file for complete search history.

(56) References Cited

U.S. PATENT DOCUMENTS

| | | | | |
|---|---|---|---|---|
| 5,589,813 A | * | 12/1996 | Nielsen | 375/257 |
| 5,835,534 A | * | 11/1998 | Kogure | 375/257 |
| 6,075,452 A | * | 6/2000 | Tsuchihashi | 340/3.1 |
| 6,275,881 B1 | * | 8/2001 | Doege et al. | 710/301 |
| 6,992,561 B2 | * | 1/2006 | Sandt et al. | 340/3.1 |
| 7,236,342 B2 | * | 6/2007 | Vazach et al. | 361/119 |
| 7,412,293 B2 | * | 8/2008 | Dold et al. | 700/79 |
| 2002/0080032 A1 | | 6/2002 | Smith et al. | |
| 2003/0102367 A1 | | 6/2003 | Monette et al. | |
| 2006/0282182 A1 | * | 12/2006 | Da Silva Neto | 700/90 |

FOREIGN PATENT DOCUMENTS

| | | |
|---|---|---|
| CN | 1230847 A | 12/1999 |
| DE | 10161401 A1 | 6/2003 |
| DE | 10328906 A1 | 1/2005 |
| EP | 0 994 350 A1 | 4/2000 |
| WO | WO 2005/001699 A2 | 1/2005 |

* cited by examiner

*Primary Examiner*—Albert DeCady
*Assistant Examiner*—Douglas S Lee

(57) ABSTRACT

In one aspect, an electric field device for use in process automation is provided to simplify supply of an electric field device located at an installation site in the process with information originating from its process environment. At least one transponder is arranged in the area of the installation site. The transponder comprises a memory containing data with predetermined information on the process environment of the field device. The field device comprises a reader unit for contactlessly reading the data and an evaluation unit for processing the information for the functions to be carried out by the field device within the framework of process automation.

18 Claims, 1 Drawing Sheet

ELECTRICAL FIELD DEVICE FOR USE IN PROCESS AUTOMATION

CROSS REFERENCE TO RELATED APPLICATIONS

This application is the US National Stage of International Application No. PCT/EP2005/004519, filed Apr. 27, 2005 and claims the benefit thereof. The International Application claims the benefits of German application No. 102004020577.9 DE filed Apr. 27, 2004, both of the applications are incorporated by reference herein in their entirety.

FIELD OF INVENTION

The invention relates to an electrical field device for use in process automation which is arranged at an installation site in the process.

BACKGROUND OF INVENTION

In process automation field devices perform predetermined measurement, control and regulation tasks at the sites at which they are installed in the process. One example of this is measurement of a substance passing through a pipe. In this case the field devices often rely on additional information from their immediate process environment. The information needed can relate to the installation site, to the bus address or process parameters provided for the field device, as in the example of an ultrasound flow measuring transducer, the nominal diameter and the material of the pipe carrying the substance on which the measuring transducer is mounted or which as a measuring tube represents a component of the measuring transducer and is installed with this in the process. Previously the information about the components of field devices was recorded during their manufacture or upgrading and stored as data in the field devices. The other information relevant for the field device from the process environment is recorded immediately before or after installation of the field device and supplied to it via its bus interface. The bus address of the field device must also be recorded at this time. This was previously done in an on-site operation or for each individual field device via its bus interface, whereby in the latter case the field devices are connected individually and the relevant bus address is assigned to them thereafter by corresponding software.

Identification systems operating with transponders and a read or read/write unit, especially including RFID (Radio Frequency Identification), systems, and also their use in access control, animal identification, vehicle immobilizers, waste disposal systems and in industrial production are generally known.

SUMMARY OF INVENTION

An object of the invention is to simplify the supply of information to field devices from their environment.

In accordance with the invention the object is achieved by at least one transponder being arranged on the field device of the type specified above, which contains in a memory data with predetermined information about the process environment of the field device, and by the field device containing a read unit for non-contact reading of the data and an evaluation unit for evaluation of the information for the functions to be executed by the field device within the framework of the process automation system.

The major advantage of the inventive field device lies in the fact that it communicates with the transponders and thus procures for itself the information that it needs from its environment. Communication can take place once or a number of times at specific points in time, whereby the data recorded by the field device is buffered in this device so that there is no non-availability of the data should the communication not be possible from time to time. A permanent interruption of the communication is detected by the field device and can lead to a corresponding error message.

The information contained in the transponder about the process environment of the field device preferably includes the devices's installation site, the bus address provided for the field device and/or specific process parameters for the installation site, especially including the dimensions of a line or of a container for feeding or accommodating substances, the type of material of the line or of the container and/or the type of substance to be measured, controlled or regulated by the field device. Thus for example an ultrasound flow measuring transducer needs information about the normal diameter and material as well as if necessary information about the type of substance in order to measure the flow of a substance. An analyzer that determines the composition of a gas mixture on the basis of its thermal conductivity needs for example information about the gas components involved.

The transponder used is preferably a passive transponder which manages without its own energy source and obtains the energy required from the field device by means of magnetic or electromagnetic fields or through light.

In the simplest case the transponder is permanently programmed and contains a read-only memory. Preferably however the memory of the transponder is a read/write memory whereby data provided for the transponder is able to be transmitted to the field device, for example over its bus interface, and can be transmitted using a non-contact system into the transponder.

BRIEF DESCRIPTION OF THE DRAWINGS

For further explanation of the invention reference is made below to the drawing, for which the Figures are as follows FIG. 1 an exemplary embodiment for the inventive field device with an assigned transponder, and FIG. 2 a block diagram of the field device with the transponder.

DETAILED DESCRIPTION OF INVENTION

Figure 1:
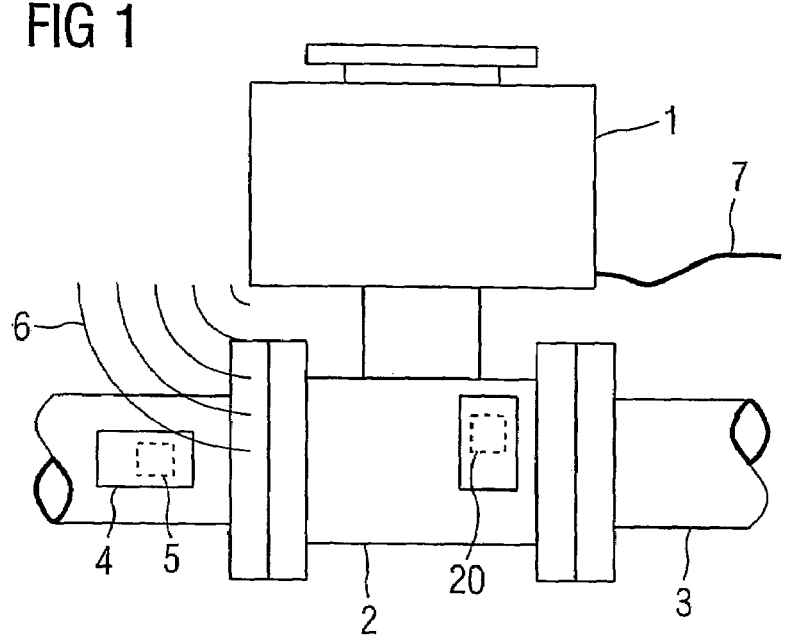

FIG. 1 shows a field device 1, for example a pressure measuring transducer which is built in via a flange connection 2 to a pipe 3 of a process which processes a substance for example. A label 4 with the transponder 5 is attached to the pipe 3 or to another suitable location such as the flange connection 2 for example. The field device 1 communicates via radio 6 with the transponder 5 and via a bus 7 with a process automation system not shown in this diagram of which the field unit 1 is a component.

Figure 2:
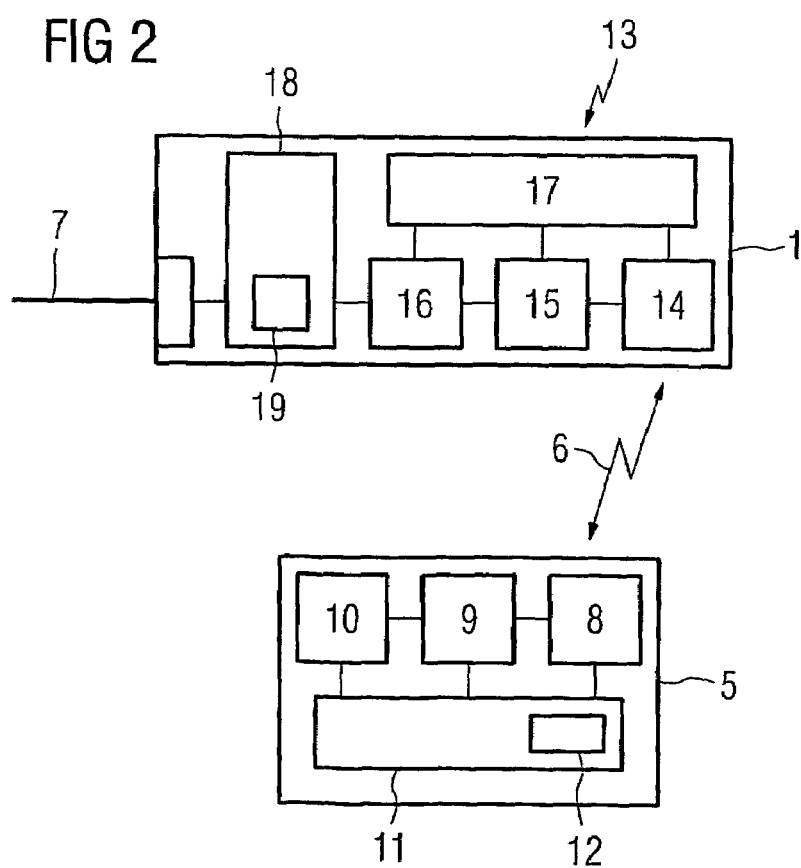

As FIG. 2 shows, the transponder 5 contains an antenna 8, a converter 9, a read/write memory 10 and a control logic 11 with a power supply 12 for components 5 to 11. The converter 9 converts the analog receive signals of the antenna 8 into digital signals able to be analyzed for the memory 10 or converts the data to be read out of the memory 10 into analog transmit signals. The execution sequence is controlled and monitored in this case by a control logic 11. The power supply 12 derives the energy that it needs from the receive signal of the antenna 8.

The field device 1 contains a combined transmit/read unit 13, which like the transponder 5, features an antenna 14, a converter 15 a read/write memory 16 and a control logic 17. By contrast with the transponder 5 however, the components 14-17 as well as the field device control 18 are supplied with energy via the bus 7. The field device controller 18 contains an evaluation unit 19 for the data contained in the memory 16.

The information needed by the field device about the process environment, in this case the bus address for example, is either available in the memory 10 of the transponder 5 or is fed to the field device 1 via the bus 7, a programming device for by direct manual input and is then transmitted from the field device 1 to the transponder 5.

The field device 1, or for example the replacement device newly included in the process after a defect for example, sends a request or read signal at predetermined time intervals to the frequency or encoding of which the transponder 5 responds. The transponder 5 derives in this case from the request or read signal the energy which it needs and sends the data contained in the memory 10. This data is received by the field device 1 and its information content is evaluated in the evaluation unit 19 for the field device control 18. The information and energy can be transmitted to the transponder 5 over the same paths or on different paths, for example by radio transmission on the one hand and inductive coupling on the other hand.

As FIG. 1 shows, further transponders 20 in addition to the transponder 5 can be provided for provision of further information for the field device 1.

The invention claimed is:

1. An electrical field device for use in and installed at a site of a process automation system, the process automation system further comprising a transponder for storing data about the process environment of the field device and arranged in an area of the installation site, the field device comprising:
   a reader unit for non-contact reading of the data in the transponder, the reader unit and the transponder each having a fixed location and a proximate relationship, the reader unit capable of reading the data from the transponder at any time as required for operation of the field device;
   a read/write memory for storing the data read from the transponder;
   an evaluation unit for evaluation of the stored data as related to functions to be executed by the field device within the framework of the process automation system; and
   a transmitter unit for non-contact supplying of data to the transponder to be stored there as at least some of the data about the process environment of the field device, certain of the data having previously been supplied to the field device from a bus, the bus further for supplying power to the field device.

2. The electrical field device as claimed in claim 1, wherein the data represents an item selected from the group consisting of an installation site of the electrical field device, a bus address for the field device, specific process parameters for the installation site, and combinations thereof.

3. The electrical field device as claimed in claim 2, wherein the data includes a process parameter selected from the group consisting of dimensions of a container for accommodating substances, a material type of a container for accommodating substances, a type of a substance to be measured, a type of substance to be controlled, a type of substance to be regulated, and combinations thereof.

4. The electrical field device as claimed in claim 3, wherein the container is a process line.

5. The electrical field device as claimed in claim 1, wherein the transponder is a passive transponder to which energy is supplied from the field device via a magnetic field, an electromagnetic field or light.

6. The electrical field device as claimed in claim 1, wherein the data about the process environment of the field device is first supplied to the field device and then transmitted from the field device into the transponder in a non-contact manner.

7. A system for use in a process automation system, comprising:
   a field device installed at a site of the process automation system and comprising:
      a bus to communicate with other components of the process automation system,
      a first memory unit for storage of data,
      a reader unit for non-contact reading of data from a transponder at any time as required for operation of the field device,
      a transmitter unit for non-contact supplying of data to the transponder, the data having previously been supplied to the field device from the bus, the bus further for supplying power to the field device,
      an evaluation unit for evaluation of the data in storage as related to functions to be executed by the field device within the framework of the process automation system,
   the transponder arranged in an area of the installation site so that the reader unit and the transponder each have a fixed location and a proximate relationship, the transponder having a second memory unit for storing data about the process environment of the field device as supplied to the transponder from the field device, and
   wherein the transponder sends the processing environment data to the field device and the data is stored in the first memory unit of the field device.

8. The system as claimed in claim 7, wherein the transponder sends information about the process environment of the field device at specific points in time.

9. The system as claimed in claim 7, wherein the processing environment data includes an address of the bus.

10. The system as claimed in claim 7, wherein the processing environment data includes installation site information.

11. The system as claimed in claim 7, wherein the processing environment data includes process parameters for the installation site.

12. The system as claimed in claim 7, wherein the processing environment data includes dimensions of a container for accommodating substances.

13. The system as claimed in claim 12, wherein the container is a process line.

14. The system as claimed in claim 7, wherein the processing environment is a material type of a container for accommodating substances.

15. The system as claimed in claim 14, wherein the container is a process line.

16. The system as claimed in claim 7, wherein the processing environment data includes a type of a substance to be accommodated.

17. The system as claimed in claim 7, wherein the transponder is a passive transponder to which energy is supplied from the field device via a magnetic field, an electromagnetic field or light.

18. The system as claimed in claim 7,
   wherein the second memory unit is a read/write memory unit, and
   wherein the data is supplied to the field device from the transponder and transmitted from the field device into the transponder in a non-contact manner.

* * * * *